(12) United States Patent
Brooks

(10) Patent No.: US 10,737,284 B2
(45) Date of Patent: Aug. 11, 2020

(54) TIRE CONFIGURATION SYSTEM FOR AN AGRICULTURAL MACHINE

(71) Applicant: CNH Industrial America LLC, New Holland, PA (US)

(72) Inventor: Nathan P. Brooks, Manitowoc, WI (US)

(73) Assignee: CNH Industrial America LLC, New Holland, PA (US)

(*) Notice: Subject to any disclaimer, the term of this patent is extended or adjusted under 35 U.S.C. 154(b) by 368 days.

(21) Appl. No.: 15/783,405

(22) Filed: Oct. 13, 2017

(65) Prior Publication Data

US 2019/0111447 A1    Apr. 18, 2019

(51) Int. Cl.
| | |
|---|---|
| *B05B 9/06* | (2006.01) |
| *G06F 3/0484* | (2013.01) |
| *G06F 3/0488* | (2013.01) |
| *A01B 79/00* | (2006.01) |
| *A01M 7/00* | (2006.01) |
| *A01C 23/00* | (2006.01) |

(Continued)

(52) U.S. Cl.
CPC .............. *B05B 9/06* (2013.01); *A01B 79/005* (2013.01); *A01M 7/0089* (2013.01); *G06F 3/0484* (2013.01); *G06F 3/0488* (2013.01); *G06F 3/04842* (2013.01); *A01B 63/008* (2013.01); *A01B 69/008* (2013.01); *A01C 23/008* (2013.01); *A01C 23/047* (2013.01); *A01M 7/0042* (2013.01); *A01M 7/0053* (2013.01); *A01M 7/0071* (2013.01); *A01M 7/0082* (2013.01)

(58) Field of Classification Search
CPC ....... B05B 9/06; A01B 79/005; A01B 63/008; A01B 69/008; G06F 3/0484; G06F 3/04842; G06F 3/0488; A01C 23/008; A01C 23/047; A01M 7/0042; A01M 7/0053; A01M 7/0071; A01M 7/0082; A01M 7/0089
USPC .......................................................... 701/50
See application file for complete search history.

(56) References Cited

U.S. PATENT DOCUMENTS

| | | |
|---|---|---|
| 3,846,701 A | 11/1974 | Sampey |
| 4,167,699 A | 9/1979 | Baker |

(Continued)

FOREIGN PATENT DOCUMENTS

WO    2005039936 A2    5/2005

*Primary Examiner* — Angelina Shudy
(74) *Attorney, Agent, or Firm* — Rebecca L. Henkel; Rickard K. DeMille

(57) ABSTRACT

An operator can interact with a user interface to input tire configuration information for a tires installed on an agricultural machine so that a control system of the machine can accurately apply information about the tires to display calculated parameters and/or control machine functions. In one aspect, the input could correspond to custom information for tires which the controller could use to derive tire dimensions, such as a rolling circumference of the tire, for calculating parameters. In another aspect, the input could correspond to a selection among several predetermined tire configurations. The controller can then apply the tire dimension to calculate one or more parameters, such as speed and/or distance traveled, for display, and/or to control various machine functions, such as an agricultural product application rate, steering, driveline and/or suspension control.

20 Claims, 5 Drawing Sheets

(51) Int. Cl.
*A01B 69/04* (2006.01)
*A01B 63/00* (2006.01)
*A01C 23/04* (2006.01)

(56) References Cited

U.S. PATENT DOCUMENTS

| | | | |
|---|---|---|---|
| 4,491,007 A | 1/1985 | Crowdes, Jr. | |
| 4,747,301 A | 5/1988 | Bellanger | |
| 4,926,331 A | 5/1990 | Windle et al. | |
| 4,988,976 A | 1/1991 | Lu | |
| 5,636,145 A | 6/1997 | Gorman et al. | |
| 5,924,371 A * | 7/1999 | Flamme | A01B 79/005 111/177 |
| 5,956,255 A * | 9/1999 | Flamme | A01B 79/005 111/903 |
| 6,009,354 A * | 12/1999 | Flamme | A01B 79/005 172/4.5 |
| 6,024,035 A * | 2/2000 | Flamme | A01B 79/005 111/178 |
| 6,070,538 A * | 6/2000 | Flamme | A01B 79/005 111/170 |
| 6,091,997 A * | 7/2000 | Flamme | A01B 79/005 111/903 |
| 6,708,115 B1 | 3/2004 | Nagasaka et al. | |
| 6,917,894 B2 | 7/2005 | Inge | |
| 6,925,865 B2 | 8/2005 | Oku | |
| 7,574,292 B2 * | 8/2009 | Hoeffel | B60T 8/172 152/456 |
| 7,643,912 B2 | 1/2010 | Heffington | |
| 7,978,093 B2 | 7/2011 | Sigillito | |
| 8,191,795 B2 * | 6/2012 | Grimm | A01M 7/0089 239/1 |
| 8,242,908 B2 * | 8/2012 | Butler | G06K 19/0723 340/10.1 |
| 8,365,679 B2 * | 2/2013 | Landphair | A01B 79/005 111/200 |
| 8,452,509 B2 | 5/2013 | Sujan et al. | |
| 9,095,089 B2 | 8/2015 | Pichlmaler | |
| 9,655,355 B2 * | 5/2017 | Brooks | A01C 21/002 |
| 2003/0033849 A1 | 2/2003 | LaBuy et al. | |
| 2004/0034453 A1 | 2/2004 | Funk | |
| 2004/0095362 A1 | 5/2004 | Koumoto | |
| 2004/0148057 A1 * | 7/2004 | Breed | G02B 13/008 700/242 |
| 2010/0032492 A1 * | 2/2010 | Grimm | A01M 7/0089 239/1 |
| 2011/0022267 A1 * | 1/2011 | Murphy | A01B 69/00 701/38 |
| 2013/0054101 A1 * | 2/2013 | Harries | B60K 31/00 701/54 |
| 2013/0320105 A1 * | 12/2013 | Schmidt | A01G 25/16 239/1 |
| 2016/0316616 A1 * | 11/2016 | Brooks | A01C 21/002 |
| 2018/0004222 A1 * | 1/2018 | Maruoka | B62D 15/0275 |
| 2018/0170420 A1 * | 6/2018 | Weber | B60G 9/027 |
| 2018/0317372 A1 * | 11/2018 | Schleicher | A01B 69/004 |

* cited by examiner

FIG. 6

| TIRE SIZE | TIRE BRAND | AIR PRESSURE | LOAD RATING | LOAD CAPACITY (PER TIRE) | SPEED | TIRE PART NUMBER | MODELS | ROLLING CIRCUMFERENCE | STATIC LOADED RADIUS |
|---|---|---|---|---|---|---|---|---|---|
| 320/90R50 | WHEEL CO. | 64 PSI | IF 161 | 10,200 LBS | 40 MPH | 21.51922 | SP 310F | 219 IN. | 32.9 IN. |
| 380/90R46 | WHEEL CO. | 64 PSI | IF 168 | 12,300 LBS | TBD | 21.53646 | SP 310F | 219 IN. | 32.7 IN. |
| 380/90R46 | TIRE USA | 64 PSI | VF 173 | 14,300 LBS | 40 MPH | 21.47059 | SP 310F | 216.7 IN. | 33.4 IN. |
| 380/90R50 | WHEEL CO. | 64 PSI | IF 170 | 13,200 LBS | 40 MPH | 21.51925 | SP 310F | 230 IN. | 34.5 IN. |
| 480/90R52 | WHEEL CO. | 58 PSI | 166A8 | 11,700 LBS | TBD | 21.52244 | SP 310F | 221 IN. | 33.3 IN. |
| 520/85R42 | WHEEL CO. | 35 PSI | 169A8 | 12,800 LBS | 25 MPH | 21.62490 | SP 310F | 225 IN. | 33.8 IN. |
| 650/65R42 | WHEEL CO. | 46 PSI | 170 | 13,200 LBS | 30 MPH | 21.62261 | SP 310F | 226 IN. | 33.5 IN. |

| CUSTOM TIRE CIRCUMFERENCE | 217.00 IN |
|---|---|
| CUSTOM TIRE RIM OFFSET | 0.00 IN |
| CUSTOM STATIC LOADED RADIUS | 34.00 IN |

TIRE CONFIGURATION SYSTEM FOR AN AGRICULTURAL MACHINE

FIELD OF THE INVENTION

The invention relates generally to agricultural product application equipment such as self-propelled sprayers and, in particular, to a self-propelled sprayer having a tire configuration system including a user interface configured to receive an input from an operator, in which the input corresponds to a tire selection, and a system controller in communication with the user interface, in which the system controller executes to determine a tire dimension for a tire installed on the agricultural machine according to the tire selection, apply the tire dimension to calculate a parameter with respect to the agricultural machine, and display the parameter to the user interface.

BACKGROUND OF THE INVENTION

High-clearance sprayers are getting larger and more complex, with continued efforts to increase effectiveness of application coverage. Such sprayers typically have large diameter wheels and tires to provide them with adequate clearance for operating in tall agricultural fields.

However, there are many different tire size and configuration options available for such machines. As a result, it is difficult to predict which tire size or configuration may be installed by the operator at any given time. This can adversely affect the accuracy of electronic control systems on the machine which may require knowledge of tire size for determining various parameters, such as speed or travel distance, and/or controlling various functions, such as agricultural product application or steering. It is possible for such electronic systems to apply a pre-programmed tire size approximation as a default for such determinations and/or control, but this can introduce certain errors in the system to the extent that the tires that are actually installed on the machine differ from the pre-programmed tire size approximation. What is needed is an improved system which eliminates one or more of the foregoing disadvantages.

SUMMARY OF THE INVENTION

An operator can interact with a user interface to input tire configuration information for a tires installed on an agricultural machine so that a control system of the machine can accurately apply information about the tires to display calculated parameters and/or control machine functions. In one aspect, the input could correspond to custom information for tires which the controller could use to derive tire dimensions, such as a rolling circumference of the tire, for calculating parameters. In another aspect, the input could correspond to a selection among several predetermined tire configurations. The controller can then apply the tire dimension to calculate one or more parameters, such as speed and/or distance traveled, for display, and/or to control various machine functions, such as an agricultural product application rate, steering, driveline and/or suspension control.

In one aspect of the invention, a Graphical User Interface (GUI) can be provided on a screen in an operator cab of an agricultural machine to allow an operator to update tire configuration information so that electronic control systems can correctly account for the updated tire configuration. The control system for the machine can calculate and report various parameters, such as speed or distance, based on a default configuration for the tires. If the tires are changed, the operator can access a GUI provided on a screen in the cab to input the installed tire configuration with updated information. In one aspect, multiple preset tire configurations can be displayed, and the operator can select one, or custom tire information can be entered. Tire configuration information can include: tire size, tire brand, air pressure, load rating, load capacity, speed rating, tire part number, rolling circumference, and/or static load radius. Entry of some fields, such as tire part number, can also allow auto populating of other fields based information stored by the control system or externally accessible through a network. The control system can then use the updated tire configuration information, such as the tire diameter size, to correctly calculate and report various parameters, such as speed and application rate, by correctly accounting for the distance traveled per tire revolution in a unit of time. For systems with suspension control, the updated tire information can update values such as sidewall height and flexing characteristics, or other tire characteristics that could influence suspension performance and may be considered during suspension control.

Specifically then, one aspect of the present invention provides a tire configuration system for a self-propelled agricultural machine. The tire configuration system can include: a user interface configured to receive an input from an operator, the input corresponding to a tire selection; and a system controller in communication with the user interface. The system controller can execute a program stored in a non-transient medium to: determine a tire dimension for a tire installed on the agricultural machine according to the tire selection; apply the tire dimension to calculate a parameter with respect to the agricultural machine; and display the parameter to the user interface.

Another aspect of the present invention provides a method for configuring tires on a self-propelled agricultural machine. The method can include: receiving an input from an operator through a user interface, the input corresponding to a tire selection; determining a tire dimension for a tire installed on the agricultural machine according to the tire selection; applying the tire dimension to calculate a parameter with respect to the agricultural machine; and displaying the parameter to the user interface.

Yet another aspect of the present invention provides an agricultural sprayer including: a chassis supported by front and rear wheels having front and rear tires, respectively; a sprayer boom extending transversely relative to the chassis; an operator cab supported by the chassis, the operator cab including a user interface configured to receive an input from an operator, the input corresponding to a tire selection; and a system controller in communication with the user interface. The system controller can execute a program stored in a non-transient medium to: determine a tire dimension for a tire installed on the agricultural machine according to the tire selection; apply the tire dimension to calculate a parameter with respect to the agricultural machine; and display the parameter to the user interface.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 6 is a data structure of the tire configuration system of FIG. 2; and

FIG. 7 is a custom tire selection screen of the tire configuration system of FIG. 2.

DETAILED DESCRIPTION OF THE PREFERRED EMBODIMENTS

Figure 1:
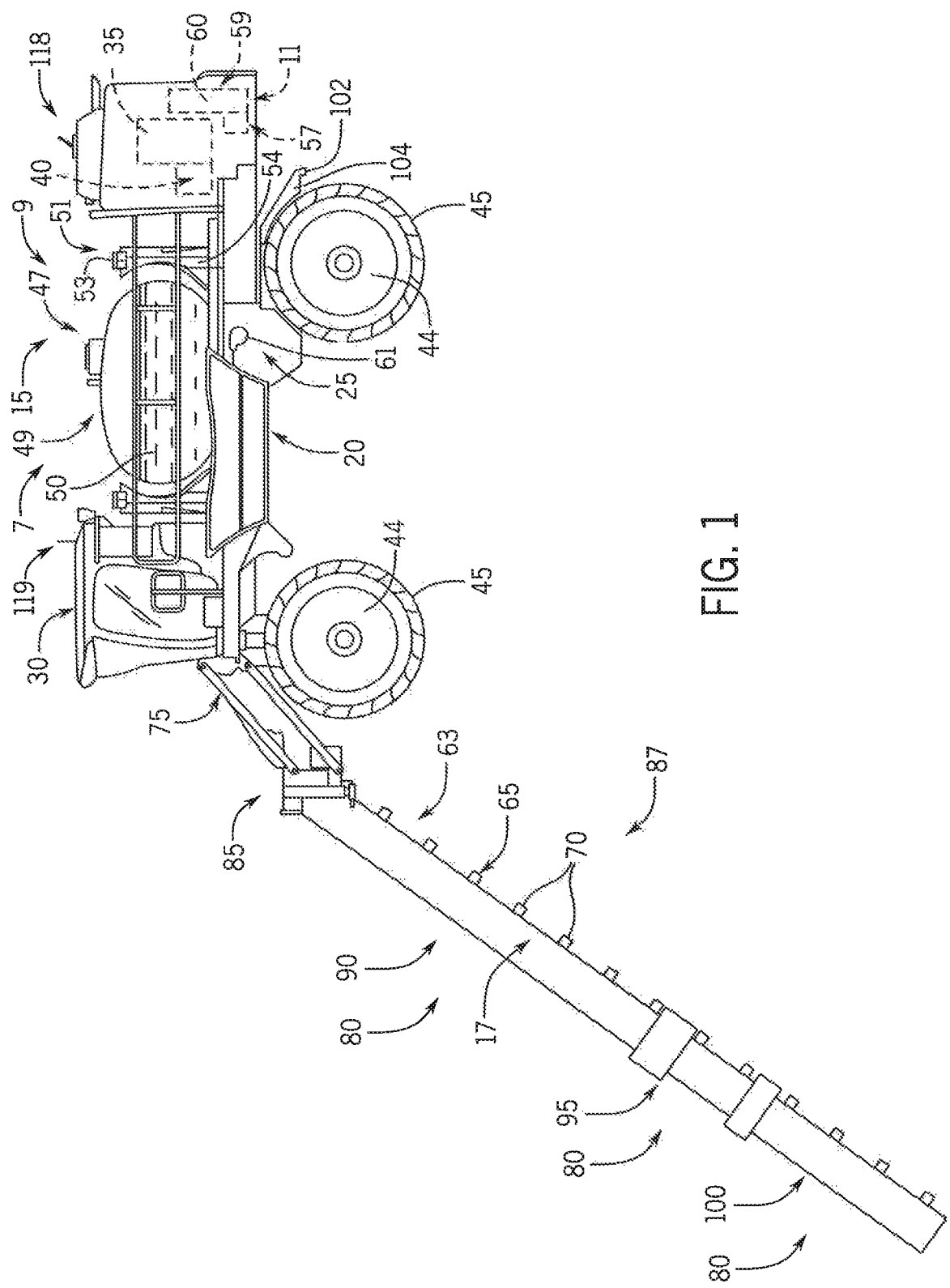
FIG. 1 is a side elevation of a self-propelled sprayer according to an aspect of the present invention.

Referring now to the drawings and specifically to FIG. 1, an agricultural sprayer is shown here as a self-propelled agricultural sprayer vehicle or self-propelled sprayer 15 having a spray boom 17, such as those available from CNH Industrial, including the Miller Nitro and Condor Series sprayers and New Holland Guardian Series sprayers. The sprayer 15 includes a chassis 20 having a chassis frame 25 that supports various assemblies, systems, and components. These various assemblies, systems, and components include a cab 30, an engine 35, and a hydraulic system 40. The hydraulic system 40 receives power from the engine 35 and includes at least one hydraulic pump which may be in a hydrostat arrangement for providing hydraulic pressure for operating hydraulic components within the hydraulic system 40. For sprayers with hydrostatic drives, hydraulic motors are operably connected to the hydraulic pump(s) for rotating wheels 44. In mechanical drive applications, a mechanical transmission receives power from the engine 35 and delivers power for rotating the wheels 44 by way of power-transmitting driveline components such as drive shafts, differentials, and other gear sets in portal, drop boxes, or other housings.

The wheels 44 can include front and rear wheels 44 having tires 45 mounted thereon. The wheels 44 and/or tires 45 may be changed by the operator over time according to various demands, such as larger diameter wheels 44 and/or tires 45 having greater rolling circumferences for operating in tall agricultural fields or providing better handling or control, or smaller diameter wheels 44 and/or tires 45 having smaller rolling circumferences for providing better mileage or acceleration and/or operator comfort.

Still referring to FIG. 1, a product system 7 can include a product storage system 47 with a product tank 49 storing an agricultural liquid product 50 on the chassis 20. Product 50 can include any of a variety of agricultural liquid products, such as various pesticides, herbicides, fungicides, liquid fertilizers, and other liquids including liquid suspensions beneficial for application onto agricultural fields by way of a spray boom 17. A rinse system 9 can include a rinse liquid storage system 51 having a rinse tank 53 storing a rinse liquid 54 such as water or another suitable rinse liquid. Also, an air purge system 11 can include a compressed air storage system having an air compressor 57 operably connected to an air tank 59 that stores air 60 compressed by a compressor 57. A flow system is configured to selectively direct liquid product 50, rinse liquid 54 and/or air 60 through various flow paths defined through the sprayer 15 and the boom 17 depending on whether a spraying procedure, a rinsing procedure, or a pneumatic purging or boom blow-out procedure is being performed. During spraying and rinsing procedures, the flow system can energize a pump 61 to convey either liquid product 50 or rinse liquid 54 to the boom 17.

In operation, the pump 61 can push either liquid product 50 or rinse liquid 54 through plumbing components such as interconnected pieces of tubing and through a boom flow system 63 that includes segments of boom tubing 65 for release out of spray boom nozzles 70 that are spaced from each another along the width of the boom 17 during spraying or rinsing operations of the sprayer 15 (according to activation/deactivation states which can be implemented, for example, using electronically controlled switches). Accordingly, such plumbing components can connect the product storage system 47, the rinse liquid storage system 51 and the boom 17 via an on-board valve system and boom valve system. During spraying procedures, groups of nozzles 70 defined in spray sections along the boom 17 can selectively deliver product 50 for release onto an agricultural field at locations corresponding to positions of activated spray sections. The boom 17 is connected to the chassis 20 with a lift arm assembly 75 that is configured to move the boom 17 up and down for adjusting the height of application of the product 50.

The boom 17 can include multiple boom segments 80 connected longitudinally to provide the corresponding width of the assembled boom 17. The boom segments 80 can include center a section 85 and left and right boom arms 87, 89 extending in opposite directions from center section 85. Left and right boom arms 87, 89 have multiple segments with pairs of primary boom segments 90, secondary boom segments 95, and breakaway boom segments 100 extending in opposite directions along the respective left and right boom arms 87, 89 mirrored about a longitudinal axis of the sprayer 15. The sprayer 15 can also include a Global Positioning System (GPS) 118 for continuously determining a current location of the machine, such as for implementation of a prescription map, and a radio communications system 119, such as for communicating with a remote server, as will be described herein.

Figure 2:
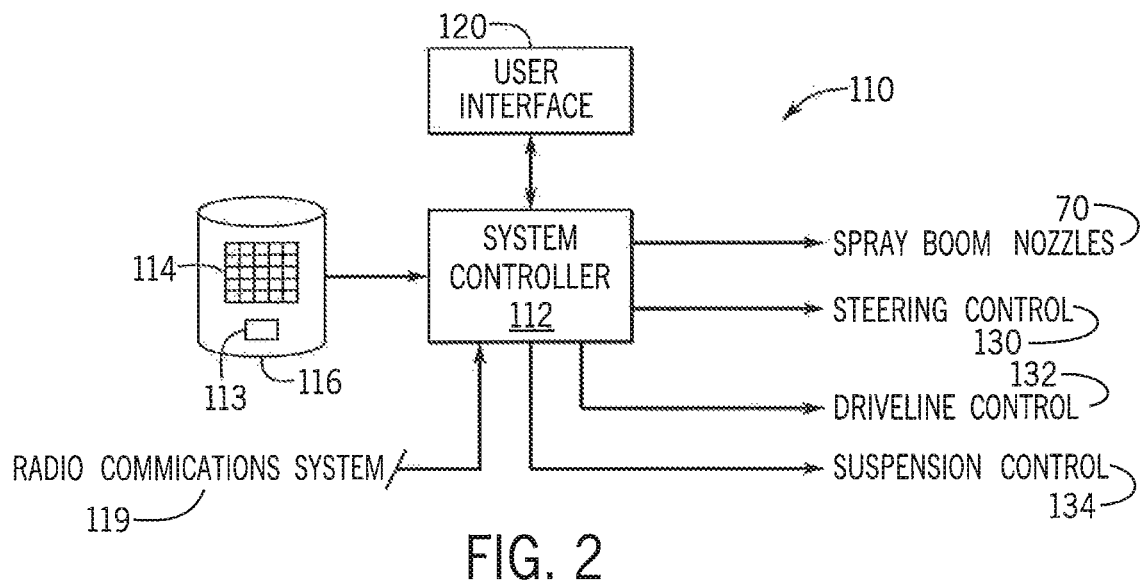
FIG. 2 is a tire configuration system of the sprayer of FIG. 1.

Referring now to FIG. 2, the sprayer 15 includes a tire configuration system 110 which can allow an operator to input tire configuration information for tires 45 installed on the sprayer 1, so that information about the tires 45 can be accurately applied to display calculated parameters and/or control machine functions. The tire configuration system 110 can include a system controller 112 in communication with a user interface 120 and a non-transient medium 116. The user interface 120 can be a touchscreen Human Machine Interface (HMI) implementing a Graphical User Interface (GUI) in the cab 30. The system controller 112 can include a processor executing a program 113 stored in the non-transient medium 116.

Figure 3:
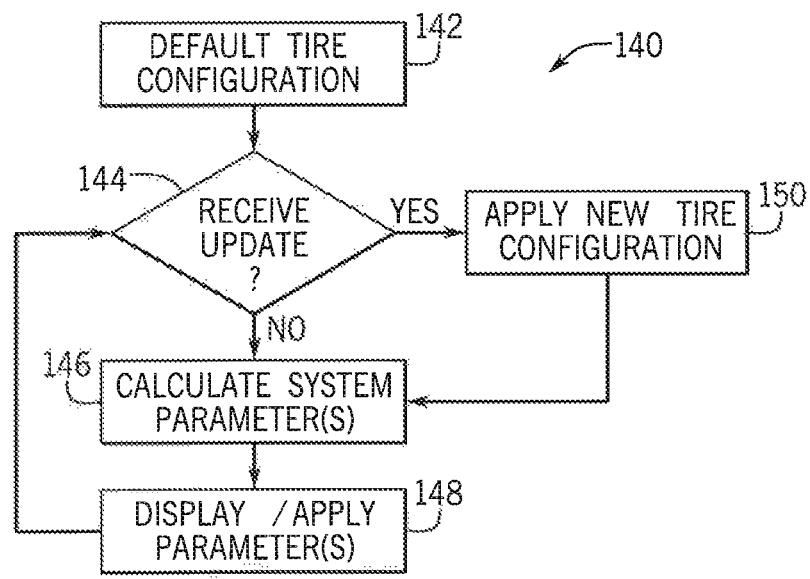
FIG. 3 is a process executed by the tire configuration system of FIG. 2.

With additional reference to FIG. 3, the system controller 112 can execute the program 113 to implement the process 140. At step 142, the system controller 112 can apply a pre-programmed tire size approximation as a default for tires 45 on the sprayer 15. This default tire configuration could correspond to tires 45 installed at the factory, or tires 45 most likely to be installed based on a geographic location and/or configuration of the sprayer 15. The default tire configuration includes a default tire dimension, which is preferably a rolling circumference for the tires 45. As used herein, a rolling circumference refers to a perimeter of the tire 45 which can correspond to a linear distance of travel following one complete revolution of the tire 45. Accordingly, the default tire configuration could include, for example, a default tire dimension that is a rolling circumference of 219 inches.

Next, at decision step 144, the system controller 112 can determine whether an input corresponding to a tire selection is received from an operator through the user interface 120. If no input is received ("No"), the process 140 can continue to step 146 in which the default tire configuration is applied, with the default tire dimension, to calculate one or more parameters with respect to the sprayer 15. Parameters could include a speed and/or distance traveled, which could be calculated, for example, by counting the number of revolutions of a tire 45 and multiplying such revolutions by the rolling circumference of the tire 45 to determine a distance traveled, and/or by dividing the distance traveled by a measured elapsed time to determine a speed. It should be appreciated that other tire dimensions, such as a tire radius or diameter, could be applied to calculate the same parameters and/or different parameters.

Next, at step 148, the system controller 112 can display the one or more parameters to the user interface 120. In addition, or alternatively, the system controller 112 can output the one or more parameters to control various machine functions, such as an agricultural product application rate, based on speed, through the spray boom nozzles 70, a steering control system 130 (which can be used to provide automatic or manual steering control with varying degrees based on tire size), a driveline control system 132 (which can be used to control power-transmitting driveline components, such as drive shafts, differentials, and other gear sets, with varying degrees based on tire size), and/or a suspension control system 134 (which can be used to control height adjustment and/or flexing control based on tire size). The process can then return to decision step 144 in a loop, continuously monitoring for input corresponding to a tire selection from an operator and updating the parameters until such input is received.

Figure 4:
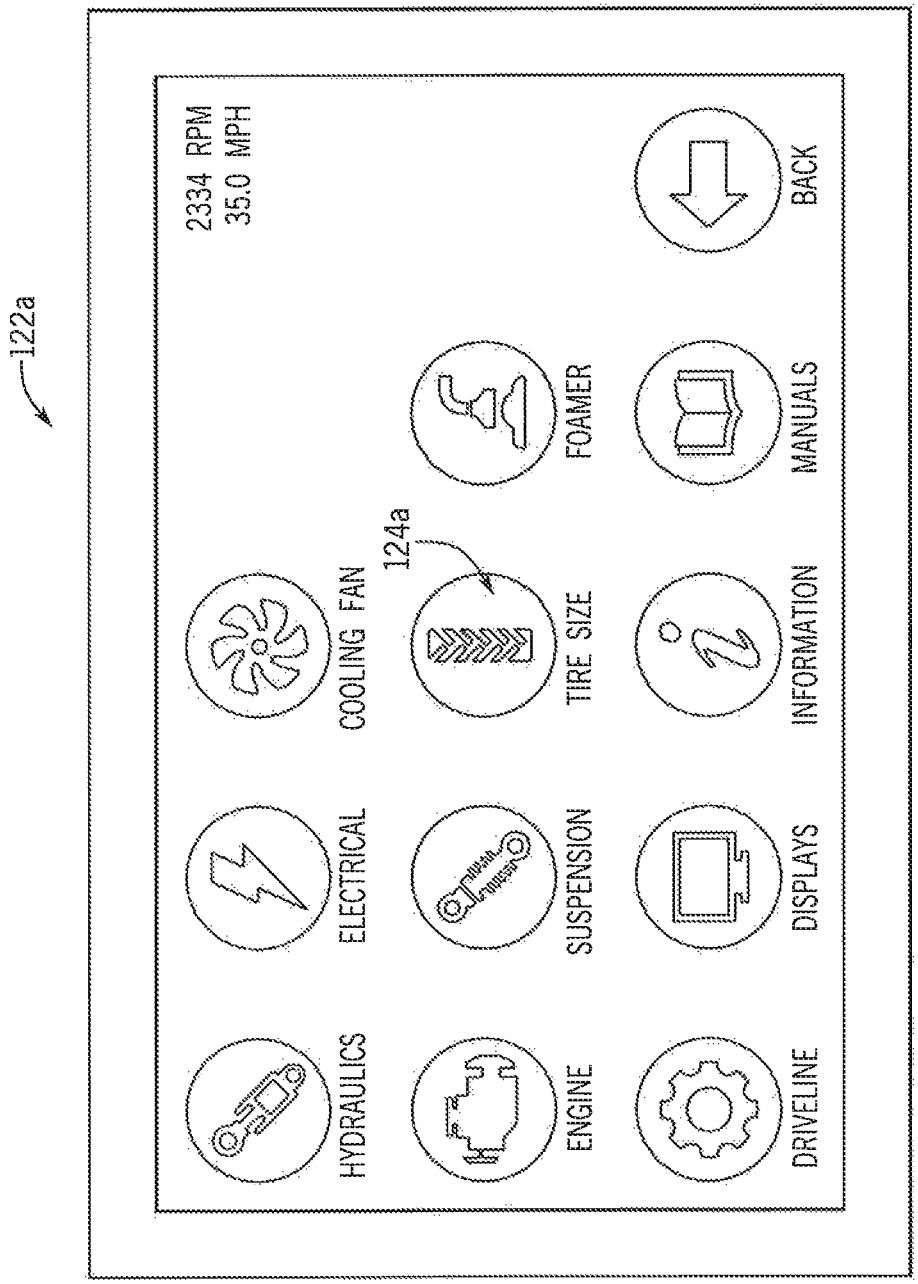
FIG. 4 is a menu screen of the tire configuration system of FIG. 2.
Figure 5:
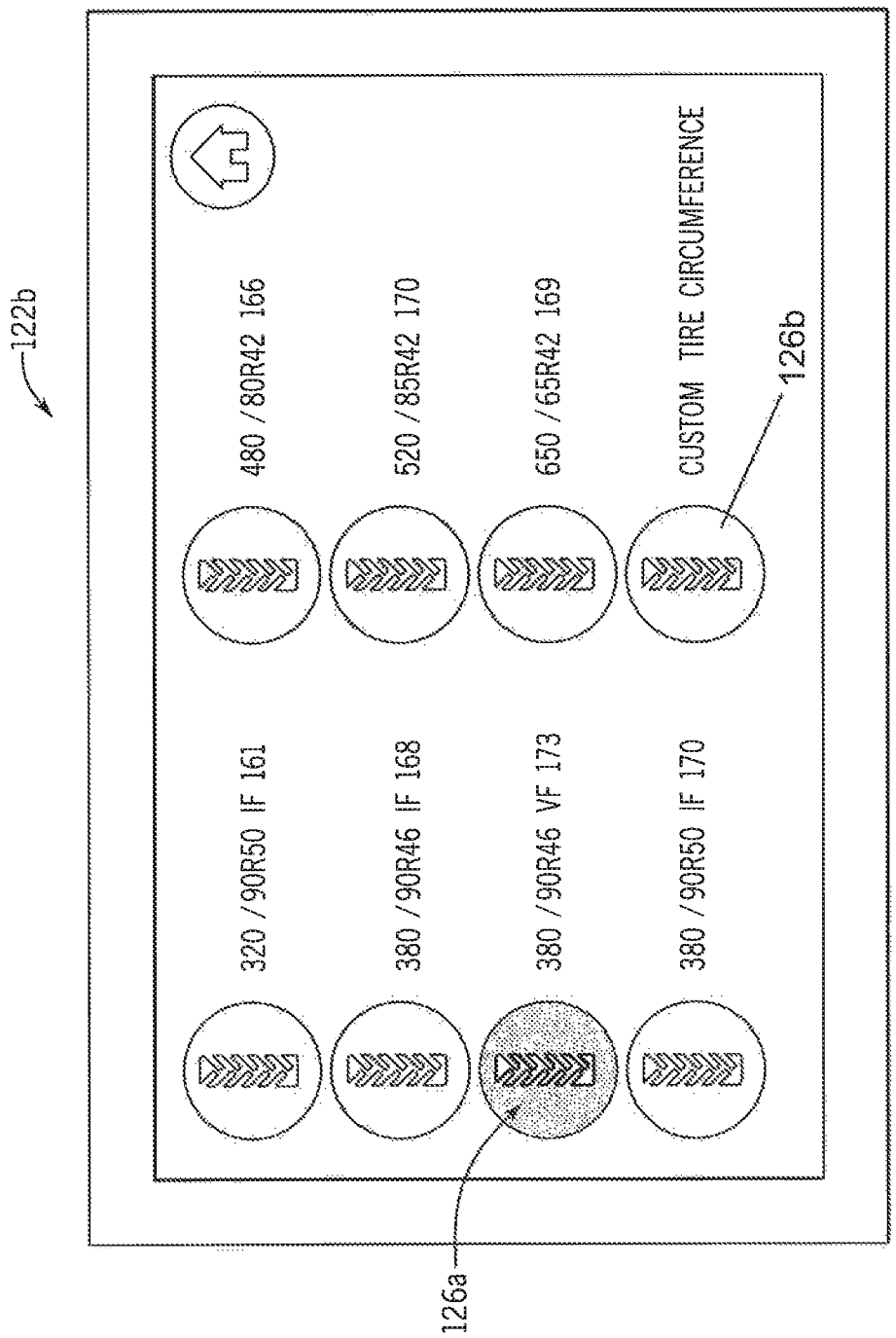
FIG. 5 is a tire selection screen of the tire configuration system of FIG. 2.

With additional reference to FIG. 4, in the cab 30, at any point during operation, an operator can select a menu screen 122*a*, implemented on the user interface 120, which can provide multiple system icons 124 for controlling various functions of the sprayer 15. One such system icon 124 can be a "tire size" icon. With additional reference to FIG. 5, selection of the tire size icon can produce a tire selection screen 122*b*, implemented on the user interface 120, which can provide multiple tire icons 126 corresponding to different tire selections. Several of the tire selections can correspond to predetermined tire configurations which could be selected by the operator. For example, selection of the tire icon 126*a* could correspond to a selection of predetermined tire configuration corresponding to a tire size of "380/90R46" and a load rating of "VF 173." With additional reference to FIG. 6, the system controller 112 can reference a data structure 114, stored in the non-transient medium 116, to determine a tire size, tire brand, load rating and/or rolling circumference corresponding to the predetermined tire configuration selected by the operator. For example, the system controller 112 could reference the data structure 114 to determine that the selection of the tire icon 126*a*, corresponding to a tire size of "380/90R46" and the load rating of "VF 173," has a tire dimensions that is a rolling circumference of 216.7 inches. Referring again to FIG. 3, the system controller 112 can then proceed to step 146, in which the predetermined tire configuration is applied, with the referenced tire dimension, to calculate the aforementioned one or more parameters with respect to the sprayer 15. Then, at step 148, the system controller 112 can display such parameters to the user interface 120, such as a speed of 35.0 MPH (mile per hour), or 2334 RPM (revolutions per minute), and return again to decision step 144 in a loop, continuously monitoring for a new input and updating parameters.

Alternatively, referring again to FIG. 5, selection of another tire icon 126*b* could correspond to selection of a custom tire configuration to be specified by the operator from which the system controller 112 could use to derive tire dimensions, such as a rolling circumference, for calculating the aforementioned parameters. With additional reference to FIG. 7, this could cause a custom tire selection screen 122*c*, implemented on the user interface 120, to be displayed to allow the operator to provide customized information for the tires 45 that are installed on the sprayer 15. Such customized information could include, for example, a rolling circumference (or "custom time circumference"), a "custom tire rime offset," and/or a "custom static loaded radius." For example, in the custom tire selection screen 122*c*, an operator could select a tire 45 having a rolling circumference of 217 inches. In addition, entry of some fields, such as a tire part number, can allow the system controller 112 to correspondingly auto populate other fields, such as the rolling circumference, based on information stored in the data structure 114 and/or externally accessible from a remote server through the radio communications system 119. Referring again to FIG. 3, the system controller 112 can then proceed to step 146, in which the custom tire configuration is applied, with the customized tire dimension, to calculate the aforementioned one or more parameters with respect to the sprayer 15. Then, at step 148, the system controller 112 can display such parameters to the user interface 120, and return again to decision step 144 in a loop, continuously monitoring for a new input and updating parameters.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A tire configuration system for a self-propelled agricultural machine having spray boom nozzles for distributing an agricultural product, the tire configuration system comprising:
   a user interface configured to receive an input from an operator, the input corresponding to a tire selection; and
   a system controller in communication with the user interface and operatively connected to the spray boom nozzles, the system controller executing a program stored in a non-transient medium to:
   determine a tire dimension for a tire installed on the agricultural machine according to the tire selection;
   apply the tire dimension to calculate a parameter with respect to the agricultural machine;
   display the parameter to the user interface; and
   vary an application rate of the agricultural product from the spray boom nozzles in response to the tire selection.

2. The tire configuration system of claim 1, wherein the agricultural machine is a sprayer.

3. The tire configuration system of claim 1, wherein the system controller further executes to display a plurality of predetermined tire configurations to the user interface, and wherein the tire selection corresponds to a predetermined tire configuration.

4. The tire configuration system of claim 3, wherein the predetermined tire configuration corresponds to a tire size, a tire brand, a load rating and a rolling circumference.

5. The tire configuration system of claim 1, further comprising a radio communications system, wherein the system controller further executes to communicate with a remote server through the radio communications system to determine the tire dimension from the tire selection.

6. The tire configuration system of claim 1, wherein the user interface comprises a touchscreen Human Machine Interface (HMI).

7. The tire configuration system of claim 1, wherein the tire dimension is a rolling circumference for the tire.

8. The tire configuration system of claim 1, wherein the parameter is a speed or distance traveled.

9. A method for configuring a self-propelled agricultural machine, the method comprising:
receiving an input from an operator through a user interface, the input corresponding to a tire selection;
determining a tire dimension for a tire installed on the agricultural machine according to the tire selection;
applying the tire dimension to calculate a parameter with respect to the agricultural machine;
displaying the parameter to the user interface; and
varying an application rate of an agricultural product from spray boom nozzles on the self-propelled agricultural machine in response to the tire selection.

10. The method of claim 9, wherein the agricultural machine is a sprayer.

11. The method of claim 9, further comprising displaying a plurality of predetermined tire configurations to the user interface, wherein the tire selection corresponds to a predetermined tire configuration.

12. The method of claim 11, wherein the predetermined tire configuration corresponds to a tire size, a tire brand, a load rating and a rolling circumference.

13. The method of claim 9, further comprising communicating with a remote server through a radio communications system to determine the tire dimension from the tire selection.

14. The method of claim 9, wherein the user interface comprises a touchscreen Human Machine Interface (HMI).

15. An agricultural sprayer comprising:
a chassis supported by front and rear wheels having front and rear tires, respectively;
a sprayer boom extending transversely relative to the chassis, the sprayer boom including spray boom nozzles for distributing an agricultural product;
an operator cab supported by the chassis, the operator cab including a user interface configured to receive an input from an operator, the input corresponding to a tire selection; and
a system controller in communication with the user interface, the system controller executing a program stored in a non-transient medium to:
determine a tire dimension for a tire installed on the agricultural machine according to the tire selection;
apply the tire dimension to calculate a parameter with respect to the agricultural machine;
display the parameter to the user interface; and
varying an application rate of the agricultural product from the spray boom nozzles in response to the tire selection.

16. The agricultural sprayer of claim 15, wherein the agricultural machine is a sprayer.

17. The agricultural sprayer of claim 15, wherein the system controller further executes to display a plurality of predetermined tire configurations to the user interface, and wherein the tire selection corresponds to a predetermined tire configuration.

18. The agricultural sprayer of claim 17, wherein the predetermined tire configuration corresponds to a tire size, a tire brand, a load rating and a rolling circumference.

19. The agricultural sprayer of claim 15, further comprising a radio communications system, wherein the system controller further executes to communicate with a remote server through the radio communications system to determine the tire dimension from the tire selection.

20. The agricultural sprayer of claim 15, wherein the user interface comprises a touchscreen Human Machine Interface (HMI).

* * * * *